(12) United States Patent
Heigl et al.

(10) Patent No.: US 7,926,841 B2
(45) Date of Patent: Apr. 19, 2011

(54) VEHICLE OCCUPANT PROTECTION DEVICE

(75) Inventors: Juergen Heigl, Boebingen (DE); Steffen Rothweiler, Alfdorf (DE); Marco Stix, Schwaebisch Gmuend (DE); Steffen Wanner, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 41 days.

(21) Appl. No.: 12/321,516

(22) Filed: Jan. 22, 2009

(65) Prior Publication Data

US 2009/0184502 A1  Jul. 23, 2009

(30) Foreign Application Priority Data

Jan. 22, 2008  (DE) .................. 10 2008 005 592
Jul. 23, 2008  (DE) .................. 10 2008 034 331

(51) Int. Cl.
*B60R 21/213* (2006.01)
*B60R 21/231* (2006.01)
(52) U.S. Cl. .................. 280/730.2; 280/743.1
(58) Field of Classification Search .......... 280/730.2, 280/743.1; *B60R 21/22*
See application file for complete search history.

(56) References Cited

U.S. PATENT DOCUMENTS

| 2002/0027342 A1* | 3/2002 | Sauer et al. ............ 280/730.2 |
| 2003/0052477 A1* | 3/2003 | Challa et al. ........... 280/730.2 |
| 2003/0057683 A1* | 3/2003 | Wipasuramonton et al. ........... 280/730.2 |
| 2004/0017067 A1* | 1/2004 | Daines et al. .......... 280/730.2 |
| 2004/0251666 A1* | 12/2004 | Shaker et al. .......... 280/730.2 |
| 2005/0006882 A1* | 1/2005 | Wang .................... 280/730.2 |
| 2005/0012313 A1* | 1/2005 | Walsh ................... 280/743.1 |
| 2005/0121888 A1* | 6/2005 | Sato et al. ............. 280/730.2 |
| 2008/0084052 A1* | 4/2008 | Abney et al. .......... 280/730.2 |

FOREIGN PATENT DOCUMENTS

| JP | 2003-137059 A | * | 5/2003 |
| JP | 2003-231452 A | * | 8/2003 |
| JP | 2005-239038 A | * | 9/2005 |

* cited by examiner

*Primary Examiner* — Ruth Ilan
(74) *Attorney, Agent, or Firm* — Tarolli, Sundheim, Covell & Tummino LLP (57) ABSTRACT

A vehicle occupant protection device has a large-area, inflatable gas bag which includes a gas bag wall having an impact surface for the occupant and which has a non-inflatable portion. The non-inflatable portion is provided with at least one elongated opening which can expand and therefore permits a movement of the impact surface upon impact of the occupant and prevents the latter from slipping off from the gas bag.

21 Claims, 6 Drawing Sheets

VEHICLE OCCUPANT PROTECTION DEVICE

TECHNICAL FIELD

The invention relates to a vehicle occupant protection device having a large-area, inflatable gas bag which includes a gas bag wall having an impact surface for the occupant and has at least one non-inflatable portion.

The invention relates in particular to a large-area head-side gas bag which has the shape of a cushion and covers a large area of at least one side window of a vehicle.

BACKGROUND OF THE INVENTION

Large-area head-side gas bags have a relatively flat design and are intended to hold the occupant's head within the vehicle in case of a side impact or a vehicle roll-over.

Especially in case of roll-overs, it is difficult to prevent the head from completely slipping off from the gas bag.

It is an object of the invention to provide a vehicle occupant protection device in which the body part to be restrained, in particular in case of a side impact the head is largely maintained in its position.

SUMMARY OF THE INVENTION

In a vehicle occupant protection device of the type initially mentioned, this is achieved in that the non-inflatable portion is configured so as to be expandable at least in sections in the inflated state of the gas bag and therefore permits a movement of the impact surface upon impact of the occupant.

The expandable portion has a kind of extensibility or moveability which is greater than that of the adjacent portions which are configured to be non-expandable. The non-expandable portions are in particular inflatable portions in which the conventional gas bag fabric is produced so as to be extremely resistant to extension.

According to one embodiment, the impact surface is not an expandable portion and cannot be extended or can be extended merely to an insignificant extent.

A further embodiment of the invention provides that in the inflated state of the gas bag, the non-inflatable portion is provided with at least one elongated opening which can expand and therefore permits the movement of the impact surface upon impact of the occupant. In this embodiment, the expandability is obtained by the elongated opening or the plurality of elongated openings. The non-inflatable portion is a flat portion of the gas bag in which the opposite gas bag layers are interwoven or sewn or in which only one gas bag layer is present.

Owing to the at least one and preferably several openings, a displaceability of the impact surface in the moving direction of the plunging body part is obtained. This moveability results in that the body part is "caught" and can no longer slip off from a hard smooth surface. The opening is continuous, i.e. cuts the gas bag wall through and does of course not constitute a blow-out opening or similar since it is arranged in the non-inflatable portion.

As already mentioned, several elongated openings are also provided according to some embodiments, by which an even higher moveability or an even larger movable surface can be produced or defined, respectively.

Preferably, the elongated openings can be slots, that is merely cuts in the gas bag wall.

The opening(s) need not be already present in the initial state, i.e. in the folded state, either, because one embodiment provides that the gas bag wall has a weak line or, in the case of several openings, weak lines tearing open so as to form the opening(s) when the gas bag contacts the occupant. If a plurality of openings is present, this leads to the advantage that the wall tears open only at such highly loaded points with which the occupant comes into contact.

As already mentioned, too, the gas bag itself is in particular a large-area head-side gas bag having the shape of a cushion or of a mattress. This means that in a side view of the vehicle, the extension of the gas bag is clearly larger than its depth in the transverse direction of the vehicle. Due to the configuration of several chambers which are partly connected with each other, the depth or thickness can be designed to be very uniform.

The head-side gas bag should cover at least one side window, preferably even several side windows. In the last case, it is a head-side gas bag which starts near the A pillar in the vehicle and extends to the rear up to the vicinity of the C or D pillar.

A first embodiment provides that the elongated opening, in particular the plurality of elongated openings extend(s) between the upper gas bag fastening and the inflatable portion. In this embodiment, it is particularly advantageous if the opening(s) extend(s) substantially horizontally and then expand(s) downwards in case of load.

In other respects, the term "expansion" does not mean that the wall surrounding the openings is configured so as to be elastic; rather, the elongated opening is given a different shape and is widened, for example, at an angle of 90° with respect to the longitudinal extension so that a displaceability of the adjacent gas bag wall in this direction is obtained.

Without the opening(s) between the gas bag fastening and the inflatable portion, the gas bag would have a high positional stability in the vertical direction when a head slides along the gas bag from top to bottom. Due to the ability to be displaced, the gas bag slightly moves along with the head and catches the head, so to speak. Due to the moveability produced by the opening(s), the gas bag can move in the impulse direction and thus produce a kind of oblique surface which makes a slipping off more difficult.

The non-inflatable region can also be arranged in the impact surface or form the impact surface. Here, one embodiment provides to arrange the at least one opening in the non-inflatable region also in the impact surface. The opening is dimensioned such that the body part to be restrained plunges partly, but merely partly and not completely, into the opening. As a result, the body part is caught like in a pocket, so to speak, which prevents the occupant from slipping off. The opening must be adapted to the body part accordingly and, on the one hand, be large enough for the plunging in and, on the other hand, be small enough to prevent the passage through the opening. In the head gas bag, a small part of the head can pass through the opening, but the entire head remains in front of the opening.

The opening has, in particular in a head gas bag, a maximum length of 120 mm which excludes that the head passes through the opening.

Due to the opening into which the gas bag penetrates, the impact surface takes an oblique position and prevents a slipping off.

It is of course preferably possible to provide a row of openings which are arranged next to each other or one behind the other and increase the impact surface or permit a position of the impact surface which is more oblique when the body part to be restrained plunges in.

The opening(s) can also be arranged in the lower third of the gas bag so that an inflated bead is positioned below the openings. The occupant strikes the gas bag above this bead, the openings permit a deep penetration or a partial passage therethrough or a partial oblique positioning of the gas bag, and the lower bead prevents a further slipping off downwards because after having plunged in, the body part to be restrained comes to rest above the bead, so to speak. The body part is caught like in a pocket in this case as well.

The openings need not run in one single linear row, they can generally form an L-, T-, V-, U- or cross-shape. Several adjacent openings can together form these shapes. However, meeting slots can also be provided which together form the above shapes.

A further embodiment provides that the impact surface is configured as a resilient portion which is delimited by less resilient portions so that the body part to be restrained plunges into the resilient portion and is prevented from slipping off from the gas bag. This solution, too, is a so-called pocket solution since the impact surface as a resilient portion permits a partial displacement or tilting of the gas bag so that the impact surface, along with the adjacent portion that is not displaced, can exert a restraint effect against the slipping off.

The resilient portion should be delimited by a plurality of openings with respect to the adjacent, less resilient portions.

It is also advantageous if the resilient portion is delimited downwards by an inflated bead which ensures a stability downwards.

The openings can together form two extension lines, the resilient portions being defined therebetween, these extension lines being adapted to extend generally downwards or upwards and chronically towards each other or largely parallel to each other.

Openings can extend substantially vertically, also such openings which together with adjacent openings define extension lines.

According to the preferred embodiment, the impact surface is partly or completely surrounded by an expandable portion. This can be obtained, for example, by an arc-shaped, L-shaped or U-shaped extension of the expandable portion.

It is furthermore possible that the impact surface is an inflatable region which is surrounded at least partially by a non-inflatable portion. That means that the impact surface itself is stable and becomes displaceable as a whole due to the expandable portion.

According to the preferred embodiment, a kind of pocket is formed by the expandable portion(s), which can be displaced in the impact direction. The occupant pushes this pocket, more specifically this impact surface, away within the entire gas bag and therefore provides a recess into which the body part to be restrained penetrates and is thus fixed in place.

A further embodiment provides that the impact surface itself is a large-area, extensible gas bag portion. The latter is in particular surrounded by inflatable portions.

The large-area, extensible gas bag portion is a gas bag fabric portion which preferably has numerous elongated openings or slots.

To prevent the occupant from projecting partly through the openings or slots which ensure the extensibility, two gas bag walls are provided which are arranged one behind the other and have offset openings or slots. A closed adjacent gas bag wall the extensibility of which is produced at a different point is thus arranged behind or in front of an opening or a slot.

BRIEF DESCRIPTION OF THE DRAWINGS

FIG. 5 shows the vehicle occupant protection device according to FIG. 4 with the head plunged in, FIG. 8 shows a fifth embodiment of the vehicle occupant protection device according to the invention as viewed from the outside of the vehicle when the head plunges in, FIG. 13 shows a protection device according to FIG. 12 with the occupant plunged in.

DETAILED DESCRIPTION OF THE EMBODIMENTS

Figure 1:
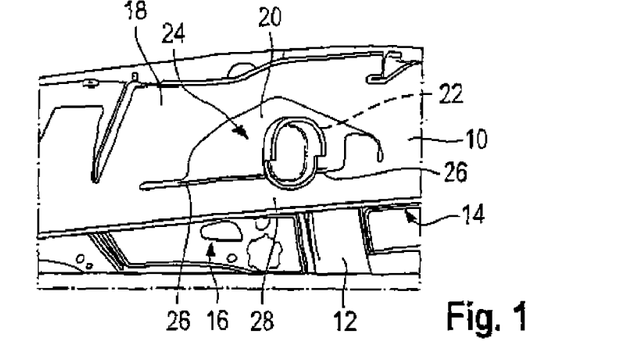
FIG. 1 shows a side view of a first embodiment of the vehicle occupant protection device according to the invention before the impact of the head, as viewed from the vehicle interior.

FIG. 1 shows a vehicle occupant protection device having a large-area head-side gas bag 10 which extends from the A pillar to the C pillar of a vehicle and above the B pillar 12. The side gas bag 10 which has the shape of a cushion or, properly speaking, of a mattress, covers the front and rear side windows 14 and 16, respectively, over a large area and nearly completely. The side gas bag 10 includes a gas bag wall having an inner and an outer fabric layer, one or more inflatable chambers 18 being formed therebetween. There are furthermore so-called non-inflatable portions 20 in which the outer and inner fabric layers are connected with each other by sewing or interweaving.

FIG. 1 symbolically shows the head 22 of an occupant. Slightly laterally in front of the head 22, the gas bag wall, more precisely the inner fabric layer, has an impact surface 24 for the body part to be restrained, in the present case the head 22. The impact surface 24 is the region in which the occupant plunges into the gas bag 10 in case of an accident in which the gas bag 10 is suitable for use as a restraint means. In a head-side gas bag, this involves in particular a side impact and a roll-over.

In the illustrated example, the impact surface 24 for the rear-seat occupant illustrated symbolically by the head 22 is partially located in the region of the chamber 18, but also mostly in the non-inflatable portion 20.

The non-inflatable portion 20 has at its lower end two elongated openings 26 each having the shape of a slot which extends horizontally. Below the slots, an inflatable bead 28 adjoins the non-inflatable portion 20.

The two openings 26 arranged one behind the other have a distance from each other so that they cannot merge into one another.

The openings 26 are formed by weak lines, for example a perforation in the fabric. The fabric does not yet tear during the inflation itself so that only the weak lines are present.

In case of a side impact or a roll-over, the head 22 strikes the impact surface 24 and thus tears open the weak line of at least one of the slot-shaped openings 26. The impact surface 24 can thus yield outwards so that the head 22 partly penetrates into the opening 26 without passing therethrough (cf. FIG. 2). As a result, the head 22 is prevented from slipping off downwards since the head 22 is caught like in a pocket. It can moreover rest against the bead 28.

The openings 26 form an expandable portion. The adjacent regions, in particular the impact surface 24, are configured so as to be inextensible. This also applies to the embodiments below.

In the embodiment illustrated in FIG. 1, the openings 26 are arranged in the lower third of the gas bag 10.

Figure 3:
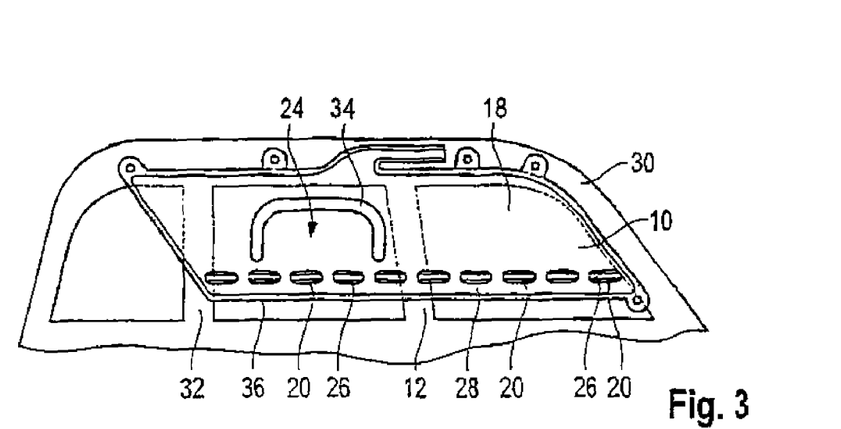
FIG. 3 shows a second embodiment of a vehicle occupant protection device according to the invention, also in the form of a head-side gas bag in the inflated state and as viewed from the vehicle interior.

This is also the case in the embodiment of FIG. 3. The A pillar and the C pillar 30 and 32, respectively, are illustrated here.

The gas bag 10 according to FIG. 3 has one or more large-area chambers 18 and a non-inflatable portion 34 having the shape of U turned upside down in the region of the rear-seat occupant, and numerous short, elongated non-inflatable portions 20 which extend one behind the other at a distance from the lower edge 36 of the gas bag 10 along a horizontal line. These non-inflatable portions 20 are located above an inflatable bead 28 which, along with other elements, forms the lower edge 36.

Elongated openings 26 are formed in the non-inflatable portions 20.

If necessary, the non-inflatable portion can also be formed merely by a seam surrounding the opening.

Figure 2:
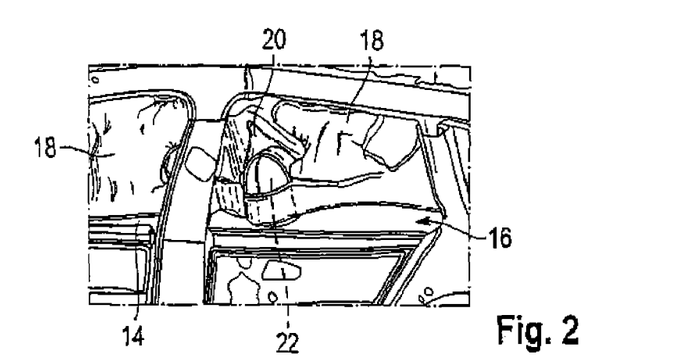
FIG. 2 shows a side view of the protection device of FIG. 1 with the head plunged in, as viewed from the outside.

When an occupant plunges into the gas bag 10, the openings 26, like the opening 26 in FIG. 2, can expand in the vertical direction so that the entire impact surface 24 is more resilient outwards than a corresponding gas bag without the openings 26. When slipping along the gas bag 10, these openings 26, into which the head partly penetrates, can prevent the latter from slipping further. This is also assisted by the continuous bead 28 along the lower edge of the gas bag 10. The openings 26 can be slots or elongated pre-stamped openings.

Figure 4:
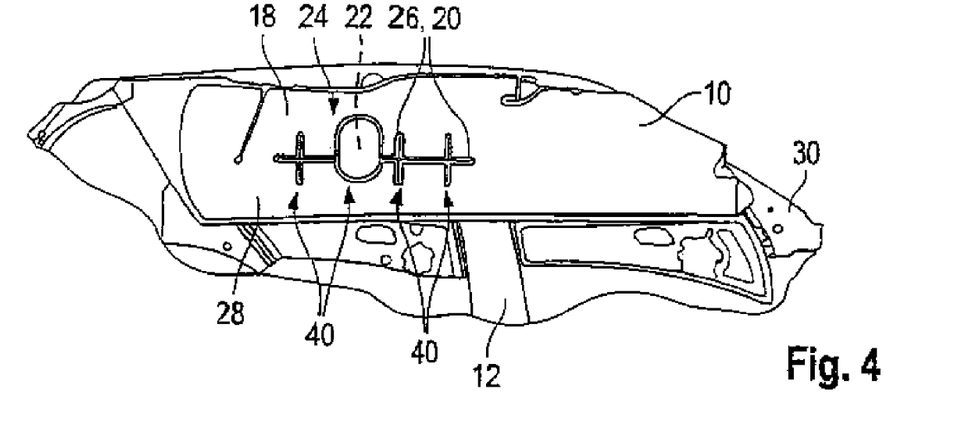
FIG. 4 shows a side view of a third embodiment of the vehicle occupant protection device according to the invention in the inflated state and as viewed from the vehicle interior.
Figure 5:
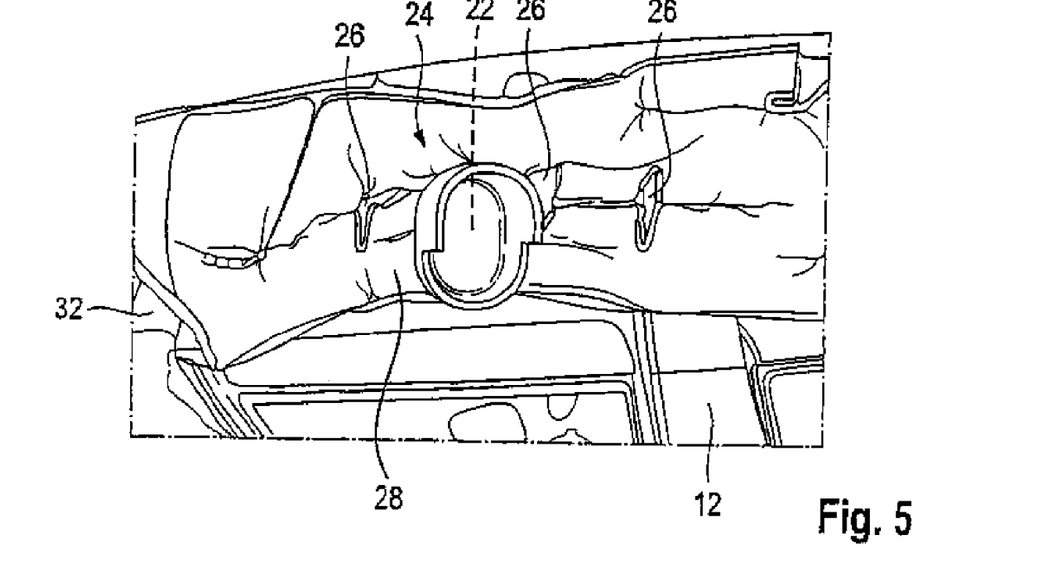

In the embodiment according to FIGS. 4 and 5, for which the reference numbers already introduced are used again for parts or regions having the same function, the gas bag 10 has openings 26 which intersect each other. This results in four cross-shaped openings 40 which are arranged horizontally one behind the other and do not merge into each other, i.e. a small web remains respectively between the crosses 40, which does not tear. A continuous horizontal bead 28 which is inflated is also produced in this case below the crosses 40. As in the remaining embodiments, the openings 26 are located in non-inflatable portions 20. These non-inflatable portions 20 are also cross-shaped and are only slightly longer and broader than the slot-shaped openings.

Naturally, like in the embodiments described above and below, no gas flows out through the openings 26.

When the head 22 strikes the gas bag 10, the highly loaded openings 26 are widely opened (cf. FIG. 5), and the head 22 can enter these wide open openings. The impact surface 24 will tilt obliquely outwards to prevent, along with the bead 28, a further slipping off downwards.

Figure 6:
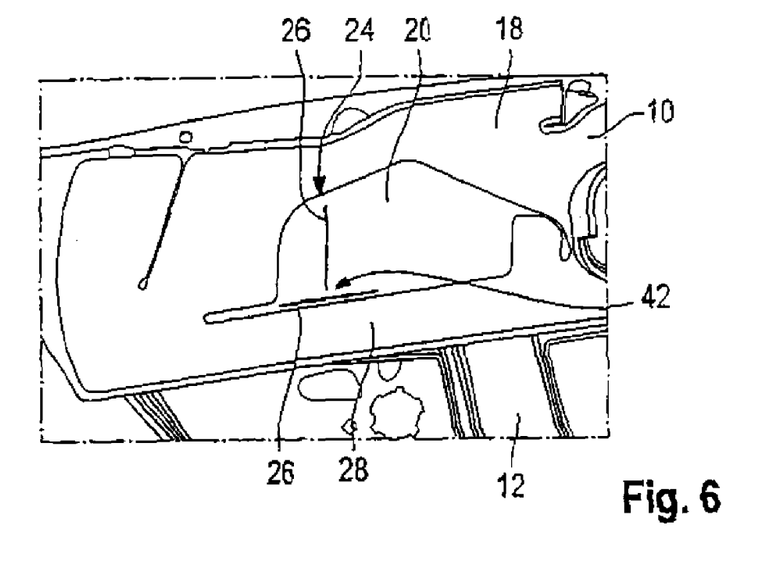
FIG. 6 shows a fourth embodiment of the vehicle occupant protection device according to the invention in the inflated state and as viewed from the vehicle interior.
Figure 7:
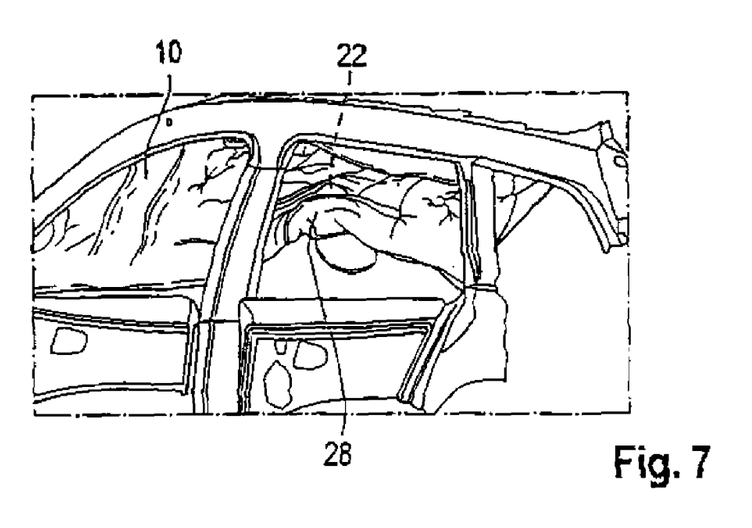
FIG. 7 shows the vehicle occupant protection device according to FIG. 6 with the head plunged in, as viewed from the outside.

A further head gas bag 10 is illustrated in FIGS. 6 and 7. The non-inflatable large-area portion 20 has a vertical slot-shaped opening 26 and a horizontal opening 26 which touch each other in a T-shape. The intermediate web 42 shown in FIG. 6 may tear upon impact of the head, which is however not obligatory. Both options are possible here.

It can be seen in FIG. 7 that the head 22 partly enters the openings 26 and is thus prevented from slipping further. It is also clearly shown here that due to the openings 26, the impact surface 24 can move outwards more strongly so as to have a horizontal component which prevents the slipping off.

Figure 8:
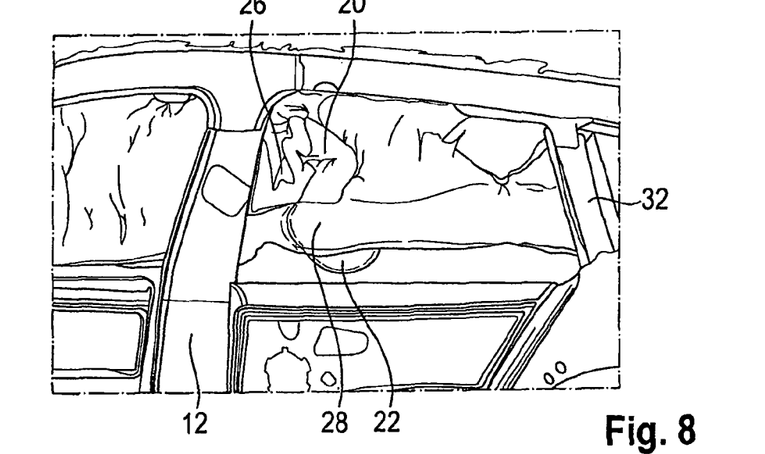

The embodiment according to FIG. 8 differs from that described above in that two elongated openings 26 are present which adjoin each other in an L-shape and thus form a kind of triangle, and which are opened upon impact of the head, as illustrated in FIG. 8.

Figure 9:
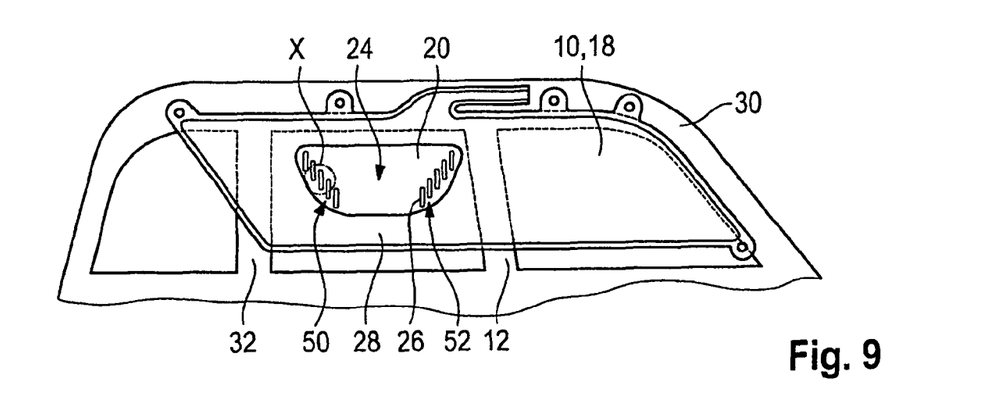
FIG. 9 shows a side view of a sixth embodiment of the vehicle occupant protection device according to the invention, as viewed from the vehicle interior.
Figure 10:
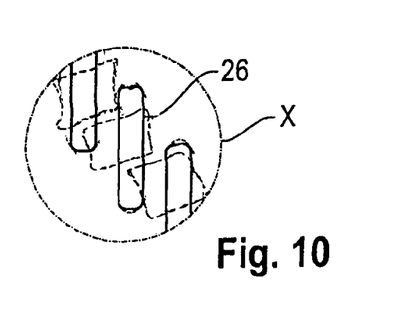
FIG. 10 shows an enlarged detail of the gas bag wall in FIG. 10 in the region denoted by X.

In the embodiment according to FIGS. 9 and 10, the non-inflatable region 20 has in the region of its front and rear ends two rows of openings 26 extending obliquely upwards and laterally offset in relation to each other and which, as viewed in the horizontal direction, overlap. The two rows form a V-shape, other embodiments being of course also conceivable in which the rows extend upwards towards each other and not upwards, as shown in FIG. 9. The rows could also extend parallel and obliquely upwards. The impact surface 24 is formed between the rows of openings 26.

In the embodiments according to FIGS. 1 to 10, the impact surface 24 is configured as a resilient portion which is delimited by less resilient portions so that the body part to be restrained plunges into the resilient portion and is prevented from slipping off from the gas bag. The resilient portion is delimited by several openings with respect to less resilient portions. In all embodiments according to FIGS. 1 to 10, the gas bag has at its lower edge an inflatable bead 28 which is also located below the openings 26. This bead 28 is preferably configured to be horizontally continuous in the region of the impact surface 24. In FIG. 10, the dashed lines depict the extended state in which the openings are widened.

When the head strikes the impact surface 24, the latter can yield outwards because the openings 26 expand in the horizontal direction, as shown in FIG. 10 by dotted lines. In the embodiment according to FIG. 9, the openings 26 together form two extension lines 50, 52 extending vertically, in particular vertically obliquely upwards. The impact surface 24 will therefore yield outwards like a trampoline and take an oblique position without springing back. As in all other embodiments, the impact surface thus becomes the resilient portion which is surrounded by less resilient portions (here the chamber 18). This is the case in all embodiments described so far and in FIGS. 11 and 12.

Figure 11:
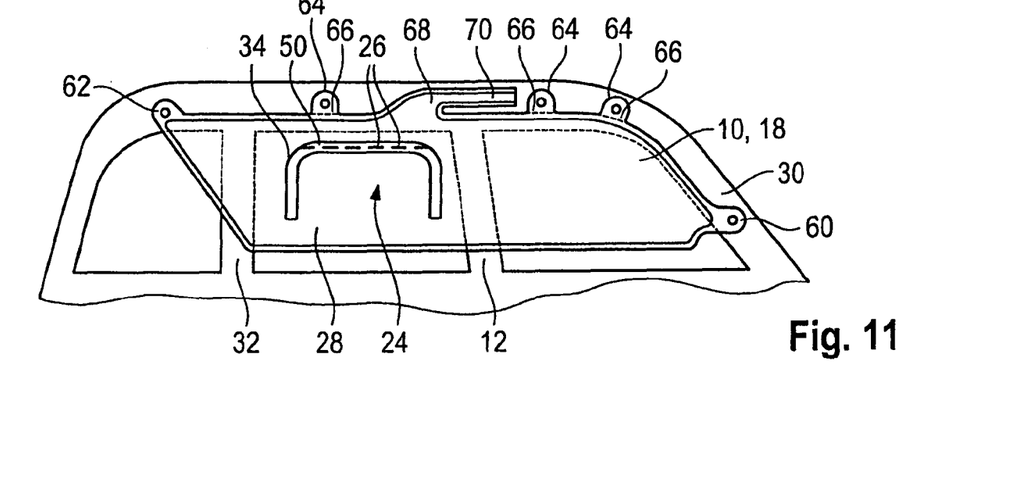
FIG. 11 shows a further embodiment of a vehicle occupant protection device as viewed from the vehicle interior.

In the embodiment according to FIG. 11, the impact surface 24 is preferably an inflatable chamber portion which is partially surrounded by a non-inflatable portion 34.

The non-inflatable portion 34 has in particular the shape of a U turned upside down, the upper portion having several openings 26 arranged one behind the other.

In case of a side impact, the impact surface 24 is pushed outwards by the striking occupant, the openings 26 opening widely or tearing open so that a kind of pocket bulging outwards is produced in which the head of the occupant is fixed.

A further specific feature is illustrated in the embodiment according to FIG. 11. This feature also contributes to an improved restraint effect, in particular in case of a roll-over, in connection with the remaining embodiments.

The illustrated side gas bag is fastened to the vehicle at several fastening points 60, 62, 64.

The two outer fastening points 60, 62 are permanent fastening points, whereas the fastenings points 64 located therebetween have merely a temporary effect since these fastenings points 64 are released or destroyed upon impact of the occupant(s) so that in these regions, the gas bag is no longer mounted vehicle-fixed and fixed in position.

The release of the fastening at the points 64 is for example obtained by weak portions 66 of the tongue-shaped gas bag fabric. These weak portions may be perforations or similar. It is furthermore of course also possible to configure the fastenings elements, for example screws, clips etc, in a releasable manner.

When inflating the gas bag, these fastening points 64 still have an effect. The fastening points 64 are not released until the predetermined force obtained by the impact of the occupant is reached, so that the gas bag is now mounted vehicle-fixed only at the fastening points 60, 62. Due to this release of the fastening points 64, the gas bag is given a higher freedom of movement so that it can be optimally positioned in front of the occupant's body which otherwise swings outwards.

The head-side gas bag shown in FIG. 11 which is effective both for the front-seat and the rear-seat occupants forms part of a so-called center module. This means that the gas generator 70 blows into the gas bag in the center region of the latter. For this purpose, an inlet channel 68 is provided, for example. Since the gas bag remains fixed to the vehicle due to the inlet channel 68, it is advantageous if the expandable portion in the form of the region including the openings 26 is located below the inlet channel 68. The gas bag is thus given more freedom of motion in this region which otherwise is rather stiff.

Figure 12:
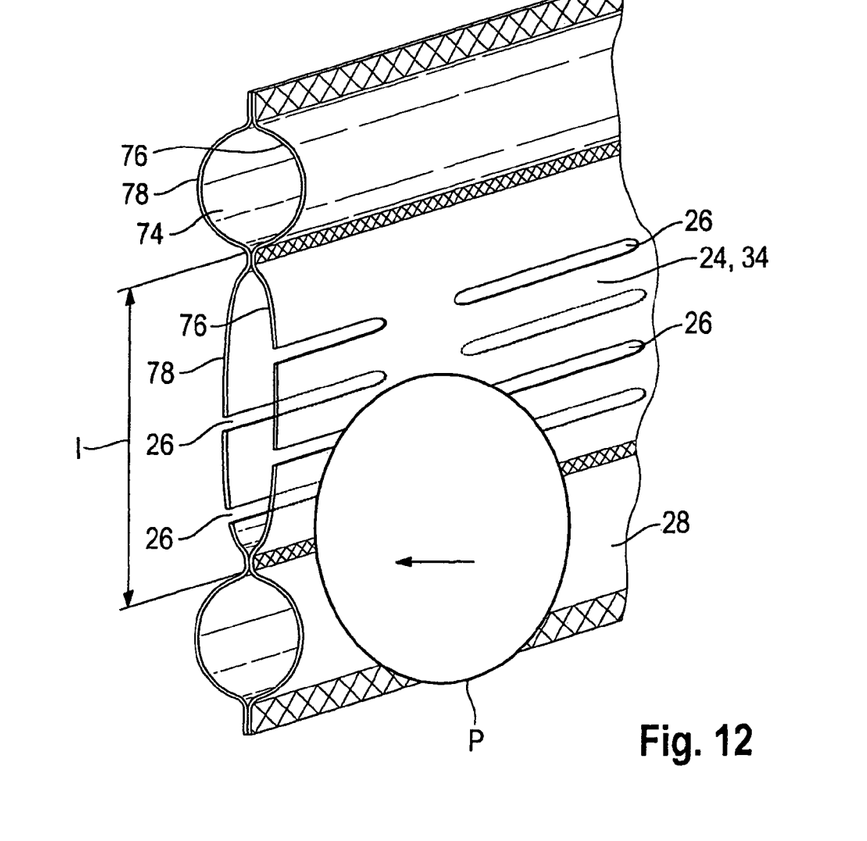
FIG. 12 shows an additional embodiment of a vehicle occupant protection device in a perspective sectional view in which the impact surface itself is configured so as to be extensible.

In the embodiment according to FIG. 12, the impact surface 24 itself is a large-area, extensible gas bag portion. This portion is surrounded by inflatable portions in the form of inflatable chambers at the upper and at the lower end of the head-side gas bag 10. The lower chamber is the bead 28. The upper chamber 74 extends in particular along the upper gas bag edge.

The large-area, extensible gas bag portion is a gas bag fabric portion having numerous elongated openings 26 or slots. The openings 26 extend for example in horizontal rows that are vertically spaced apart from each other. The openings 26 of one row are horizontally spaced apart from each other.

In order to prevent the occupant from partly passing through the openings 26 or slots which are wide open in case of load and ensure the extensibility, two gas bag walls 76, 78 arranged one behind the other are provided which have openings 26 or slots that are offset in relation to the adjacent gas bag wall. A closed, adjoining gas bag wall 76, 78 the extensibility of which is produced at another point is therefore arranged behind or in front of an opening 26 or slot. In the illustrated embodiment, the rows of openings 26 of the two gas bag walls 76, 78 are vertically offset in relation to each other. Additionally, or alternatively, the openings 26 can of course be horizontally offset in relation to each other.

The gas bag walls 76, 78 in the region of the impact surface 24 are also the walls of the adjacent chambers. However, it would also be possible to manufacture the impact surface of a less tight fabric material, either separately or during the weaving of the gas bag wall itself. This is of course also possible in combination with an integrally woven gas bag (one-woven technique). It is therefore possible to save installation space and weight.

In the state in which it is not loaded by the occupant P (FIG. 12), the non-inflatable impact surface 24 has a height I, whereas due to the load of the plunging occupant P (FIG. 13), the impact surface is expanded and has a height of I+x.

Figure 13:
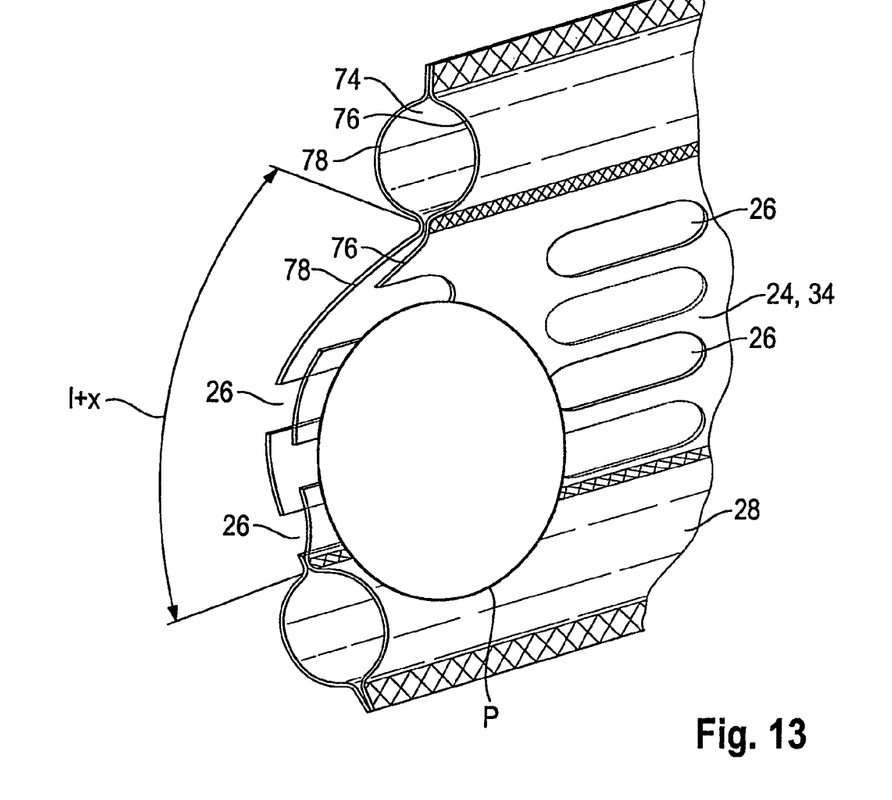

As can be seen in FIG. 13, the openings 26 of the two gas bag walls 76, 78 do not overlap in the expanded state.

Figure 14:
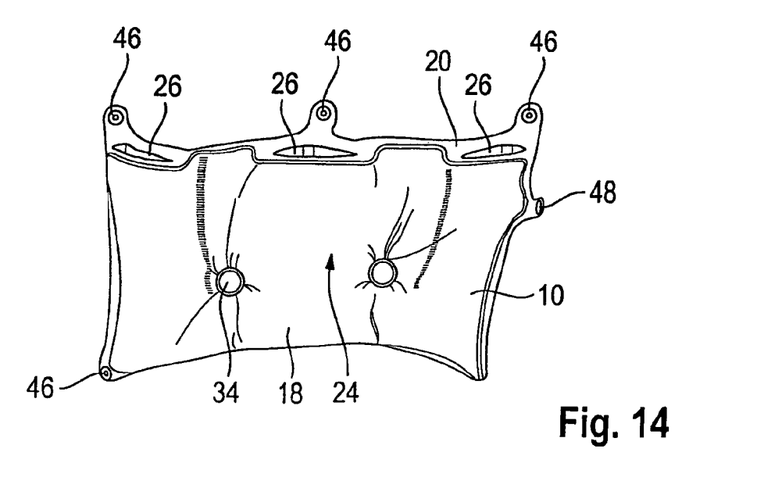
FIG. 14 shows a further embodiment of a vehicle occupant protection device as viewed from the vehicle interior.

A slightly modified embodiment is finally shown in FIG. 14. The protection device shown here in the form of a side gas bag 10 is intended for one person only. The gas bag 10 also has the shape of a cushion or a mattress and covers a large area of a side window. The edges are provided with fastenings points 46 for the fastening to the roof frame and to a vehicle pillar. Reference number 48 denotes the gas inlet channel. The upper edge of the gas bag has a horizontally extending, non-inflatable portion 20 which is provided with slot-shaped, horizontally extending openings 26 in the region of the fastenings points 26. In the inflated state illustrated in FIG. 11, the openings 26 are only slightly open. However, if the occupant strikes the impact surface 24, the openings 26 open more widely. The impact surface 24 can tilt outwards and take an oblique position, the chamber 18 can furthermore also slightly move downwards so that an obliquely positioned ramp surface is generally obtained.

The invention claimed is:

1. A vehicle occupant protection device, having
   a large-area, inflatable gas bag (10) which includes a gas bag wall having an impact surface (24) for the occupant and which has at least one non-inflatable portion (20, 34),
   in the inflated state of the gas bag (10), the non-inflatable portion (20) being provided with at least one elongated opening (26) which can expand and therefore permits a movement of the impact surface (24) upon impact of the occupant,
   wherein the elongated opening (26) is arranged in the upper third of the gas bag (10) and between an upper gas bag fastening (46) and an inflatable portion (18).

2. The vehicle occupant protection device according to claim 1, wherein the elongated opening (26) is a slot.

3. The vehicle occupant protection device according to claim 1, wherein a row of openings (26) is provided which are arranged next to each other and/or form the shape of a cross.

4. The vehicle occupant protection device according to claim 1, wherein the impact surface (24) itself is a large-area, extensible gas bag portion which is surrounded by inflatable portions.

5. The vehicle occupant protection device according to claim 1, wherein the gas bag (10) is a head-side gas bag having the shape of a cushion or mattress.

6. A vehicle occupant protection device, having
   a large-area, inflatable gas bag (100) which includes a gas bag wall having an impact surface (24) for the occupant and which has at least one non-inflatable portion (20, 34), the impact surface (24) being configured as a resilient portion which is delimited by less resilient portions so that the body part to be restrained plunges into the resilient portion and is prevented from slipping off the gas bag (10),
   the non-inflatable portion (20) being configured expandable at least in sections in the inflated state of the gas bag (10) so as to permit a movement of the impact surface (24) upon impact of the occupant,
   wherein the resilient portion is delimited by several openings (26) with respect to the less resilient portions and wherein the resilient portion is delimited downwards by an inflatable bead (28).

7. A vehicle occupant protection device, having
a large-area, inflatable gas bag (100) which includes a gas bag wall having an impact surface (24) for the occupant and which has at least one non-inflatable portion (20, 34),
the non-inflatable portion (20) being configured expandable at least in sections in the inflated state of the gas bag (10) so as to permit a movement of the impact surface (24) upon impact of the occupant,
wherein the impact surface (24) is configured as a resilient portion which is delimited by less resilient portions so that a body part of the occupant to be restrained plunges into the resilient portion and is prevented from slipping off the gas bag (10),
wherein the resilient potion is delimited by at least one opening (26) with respect to the less resilient portions and wherein the resilient portion is delimited downwards by an inflatable bead (28).

8. The vehicle occupant protection device according to claim 7, wherein a plurality of elongated openings (26) is provided.

9. The vehicle occupant protection device according to claim 7, wherein the elongated opening (26) is a slot.

10. The vehicle occupant protection device according to claim 7, wherein the gas bag wall has a weak line which tears open to form the opening (26) when the gas bag (10) contacts the occupant.

11. The vehicle occupant protection device according to claim 7, wherein the elongated opening (26) is arranged in the upper third of the gas bag (10).

12. The vehicle occupant protection device according to claim 7, wherein several openings (26) together form at least two extensions lines (50, 52).

13. The vehicle occupant protection device according to claim 7, wherein the non-inflatable portion (20) is arranged in the impact surface (24).

14. The vehicle occupant protection device according to claim 7, wherein a row of openings (26) is provided which are arranged next to each other and/or form the shape of a cross.

15. The vehicle occupant protection device according to claim 7, wherein several openings (26) are provided which together form an L-, T-, V-, U-shape or the shape of a cross.

16. The vehicle occupant protection device according to claim 7, wherein the at least one opening extends substantially vertically.

17. The vehicle occupant protection device according to claim 7, wherein the gas bag (10) is a head-side gas bag having the shape of a cushion or mattress.

18. The vehicle occupant protection device according to claim 7, wherein the impact surface (24) is partly surrounded by an expandable portion.

19. The vehicle occupant protection device according to 7, wherein the impact surface (24) itself is a large-area, extensible gas bag portion which is surrounded by inflatable portions.

20. The vehicle occupant protection device according to 7, wherein in the region of the impact surface (24), the gas bag has two gas bag walls (76,78) which are arranged one behind the other and are provided with openings (26), the openings (26) of one gas bag wall (76) being offset in relation to those of the other gas bag wall (78).

21. The vehicle occupant protection device according to claim 7, wherein the gas bag (10) is a head-side gas bag which extends from the A-pillar (30) to the C pillar (32) and has in the centre portion an inlet channel (68) for connecting to a gas generator (70), the expandable portion being arranged below the inlet channel (68).

\* \* \* \* \*